3,184,484
5,10-METHYLENE-19-NOR- AND 5,10-SECO-5,
19-CYCLO-10-FLUORO-ANDROSTENES AND
PREGNENES AND PROCESSES FOR THEIR
PREPARATION
Lawrence H. Knox, Mexico City, Mexico, assignor to
Syntex Corporation, Panama, Panama, a corporation
of Panama
No Drawing. Filed June 11, 1963, Ser. No. 286,931
Claims priority, application Mexico, Aug. 28, 1962,
68,729; Dec. 10, 1962, 70,104; Dec. 21, 1962,
70,273
24 Claims. (Cl. 260—397.3)

This invention relates to novel cyclopentanoperhydrophenanthrene derivatives and to processes for their preparation.

More particularly, this invention relates to novel 5,10-methylene-19-nor-steroids and 5,10-seco-5,19-cyclo-10-fluoro steroids of the androstane and pregnane series and to processes for their preparation, said steroids being represented by the general formulas:

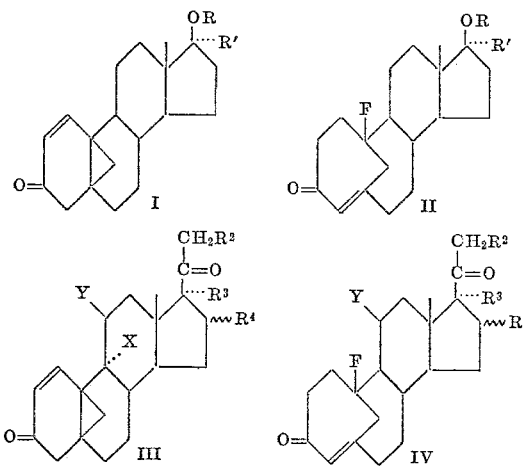

wherein R represents hydrogen or an acyl group containing less than 12 carbon atoms; $R^1$ represents hydrogen, a lower alkyl group, such as methyl, ethyl, propyl and the like, a lower alkenyl group, e.g., vinyl, or a lower alkinyl group, e.g., ethinyl; $R^2$ and $R^3$ each represent hydrogen, hydroxyl or an acyloxy radical containing less than 12 carbon atoms, $R^4$ represents hydrogen, α-methyl, β-methyl or α-hydroxyl; $R^3$ and $R^4$ taken together can also represent the grouping:

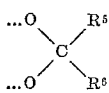

wherein $R^5$ represents hydrogen or a lower alkyl group, e.g., methyl, ethyl, propyl and the like, and $R^6$ represents hydrogen or a lower alkyl, aryl, e.g., phenyl, aralkyl, e.g., tolyl, or alkaryl, e.g., benzyl group; X represents hydrogen, fluorine or chlorine and Y represents hydrogen, β-hydroxyl or keto, with X being hydrogen when Y is hydrogen and both X and Y being hydrogen when $R^2$ is hydrogen.

The acyloxy and acyl groups referred to above are derived from hydrocarbon carboxylic acids containing less than 12 carbon atoms which may be saturated or unsaturated, of straight, branched, cyclic or cyclic-aliphatic chain, or aromatic, and may be substituted by functional groups such as hydroxy, alkoxy containing up to 5 carbon atoms, acyloxy containing up to 12 carbon atoms, nitro, amino or halogen. Typical ester groups are the acetate, propionate, enanthate, benzoate, trimethylacetate, t-butylacetate, phenoxyacetate, cyclopentylpropionate, aminoacetate, and β-chloropropionate.

The novel 5,10-methylene-19-nor-pregnenes and 5,10-seco-5,19-cyclo-10-fluoro-pregnenes represented by Formulas III and IV above can also be represented by the following more specific formulas:

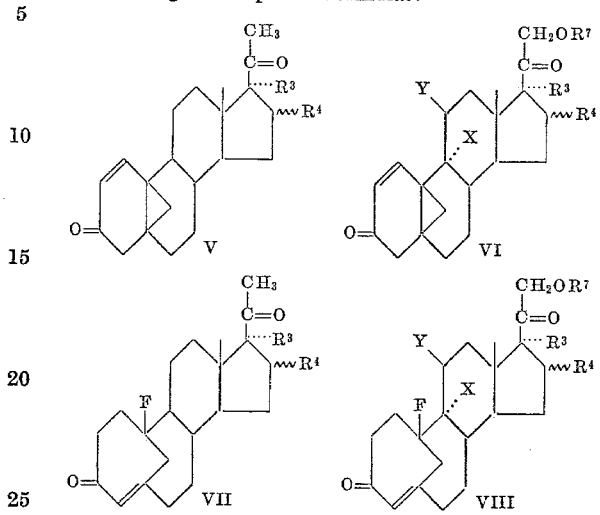

In these formulas $R^3$, $R^4$, X and Y have the same meaning as set forth hereinabove for Formulas III and IV, and $R^7$ represents hydrogen or an acyl group containing less than 12 carbon atoms.

The compounds represented by Formulas I and II are anabolic agents having a favorable anabolic-androgenic ratio. They also possess anti-estrogenic activity, inhibit the pituitary gland, and favor the deposition of calcium in bones.

The compounds represented by Formulas V and VII are progestational agents with anti-estrogenic activity. In addition, they inhibit ovulation and also show certain diuretic activity. Thus, they are useful in the maintenance of pregnancy and in fertility control. They also relieve premenstrual tension.

The compounds represented by Formulas VI and VIII are corticoid hormones having anti-inflammatory activity, useful in the treatment of arthritis, rheumatism, allergic dermatitis and eye and ear inflammations.

In accordance with the present invention the surprising discovery has been made that when a Δ⁴-3-keto-19-hydroxy steroid is treated with 1 to 2 molar equivalents of an α-fluorinated amine of the type $ACF_2N(A^1)_2$ wherein A represents a fluorinated lower alkyl group, such as difluoromethyl, chloro-fluoromethyl and the like, and $A^1$ represents a lower alkyl group, such as methyl, ethyl, propyl and the like, in an inert organic solvent containing no acidic hydrogen, at reflux temperature for a period of time in the order of about 30 minutes to about 1 hour, or at about 0 to 20° C. for a prolonged period of time, preferably between about 16 and about 24 hours, there are produced mixtures of 5,10-seco-5,19-cyclo-10β-fluoro-Δ⁴-3-keto and 5,10-cyclo-19-nor-Δ¹-3-keto compounds, in accordance with the following equation, wherein only rings A and B of the steroid molecule are represented:

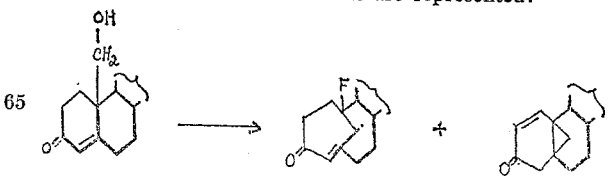

These two products may be separated by chromatography on Florisil or neutral alumina.

The fluorinated amines which I prefer to employ for this reaction are 2-chloro-1,1,2-trifluorotriethylamine (CHFClCF$_2$NEt$_2$) and 1,1,2,2-tetrafluoroethyldimethylamine. These reagents are prepared in accordance with the method described by N. N. Yarovenko et al. in Journal of General Chemistry of the U.S.S.R., 29, 1259 (1959).

Suitable solvents for use in this reaction include acetonitrile, methylene chloride; ethers such as diethyl ether, isopropyl ether, dioxane, tetrahydrofuran, Dowanol, etc.; aromatic hydrocarbons such as benzene, toluene, xylene, etc. In general, the reaction may be carried out in any organic solvent containing no acidic hydrogen.

When the above-described reaction is conducted under milder conditions, i.e., at room temperature for about 30 minutes to about 1 hour or at about 50° C. to about 90° C. for about 5 to 10 minutes, there are obtained the 5,10-seco - 5,19 - cyclo - 10$\beta$ - fluoro compounds and a small amount of the 10$\alpha$-fluoro isomers.

Essentially any 19-hydroxy-$\Delta^4$-3-keto steroid containing from 19 to 21 carbon atoms in the steroid nucleus may be used in carrying out the process of the present invention and a variety of substituents may be present in different positions of the steroid molecule, without effecting the course of the reaction. Thus, for example, keto groups may be present at the 11-, 17- and/or 20-positions, methyl groups may be present at C–6 or C–16, and alkyl, alkenyl or alkinyl radicals may be present in the 17$\alpha$-position (androstane derivatives). In the case of compounds having hydroxyl groups, such as for example at the 11-, 17- and/or 21-positions, it is recommended that the hydroxyl groups be protected, preferably by selective esterification or by formation of the 17,20;20,21-bismethylenedioxy derivative in the case of compounds possessing the dehydroacetone side chain.

Several reactions may also be effected after the reaction with the fluorinated amine. Thus, for example, a hydroxyl group may be introduced at the 11-position by microbiological methods, and the resulting 11-hydroxylated compounds may also be oxidized to the corresponding 11-keto derivatives or transformed into the 9$\alpha$-halo-11-oxygenated compounds by following the method described by Fried et al. in J. Am. Chem. Soc. 75, 2273 (1953).

A hydroxyl group may be introduced at C–16 by incubation with *Streptomyces roseochromogenus*.

The 21-hydroxyl groups may be eliminated by known methods, such as for example, by formation of the 21-tosylate and elimination of the tosyloxy group by reflux with sodium iodide in acetic acid.

The following examples serve to illustrate but are not intended to limit the scope of the present invention:

PREPARATION I

A solution of 5 g. of $\Delta^5$-androstene-3$\beta$,19-diol-17-one (U.S. Patent 3,065,228) in 250 cc. of thiophene-free benzene was treated with 27.5 cc. of a 4 N-ether solution of methyl magnesium bromide and the mixture was refluxed for 3 hours in the absence of moisture. The cooled mixture was cautiously treated with an excess of aqueous solution of ammonium chloride and the product was isolated by extraction with ethyl acetate.

The extract was washed with water, dried over anhydrous sodium sulfate and evaporated to dryness.

By recrystallization from methylene chloride-hexane there was obtained 17$\alpha$-methyl-$\Delta^5$-androstene-3$\beta$,17$\beta$,19-triol.

$\Delta^5$-androstene-3$\beta$,19-diol-17-one was treated in accordance with the above procedure, except that methyl magnesium bromide was substituted by ethinyl magnesium bromide and by vinyl magnesium bromide, giving respectively 17$\alpha$ - ethinyl - $\Delta^5$ - androstene - 3$\beta$,17$\beta$,19 - triol and 17$\alpha$-vinyl-$\Delta^5$-androstene-3$\beta$,17$\beta$,19-triol.

PREPARATION II

A solution of 1 g. of 17$\alpha$-methyl-$\Delta^5$-androstene-3$\beta$,17$\beta$, 19-triol in 10 cc. of toluene and 2 cc. of cyclohexanone was dried by distillation of 3 cc. of the solvent mixture, there was added a solution of 250 mg. of aluminum isopropoxide dissolved in 2 cc. of anhydrous toluene and ½ cc. of cyclohexanone and the mixture was refluxed for 10 minutes; there was added 1 cc. of acetic acid and the solvents were eliminated by steam distillation. The product was extracted several times with ethyl acetate and the organic extracts were washed with a 5% hydrochloric acid solution, then with water, 10% sodium carbonate solution and water to neutral, dried over anhydrous sodium sulfate and evaporated to dryness. By crystallization from acetonehexane there was obtained 17$\alpha$-methyl-$\Delta^4$-androstene-17$\beta$,19-diol-3-one.

PREPARATION III

A mixture of 1 g. of 17$\alpha$-ethinyl-$\Delta^5$-androstene-3$\beta$,17$\beta$,-19-triol, 1 g. of p-toluenesulfonic acid, 50 cc. of acetic acid and 25 cc. of acetic anhydride was kept at room temperature for 24 hours. Then it was poured into water and stirred until the excess anhydride was hydrolyzed. The product was isolated by addition of methylene chloride, and by crystallization of the residue from acetone-ether, there was obtained the tri-acetate of 17$\alpha$-ethinyl-$\Delta^5$-androstene-3$\beta$,17$\beta$,19-triol.

To a solution of 1 g. of the latter tri-acetate in 100 cc. of methanol, was added 1 gram of potassium carbonate dissolved in 10 cc. of water. The resulting mixture was kept for 2 hours at room temperature, then it was neutralized with approximately 1 cc. of acetic acid and concentrated to a small volume. Water was added and the product extracted with ethyl acetate. The extract was washed with water, dried over anhydrous sodium sulfate and evaporated to dryness. By crystallization from acetonehexane there was obtained the 17-acetate of 17$\alpha$-ethinyl-$\Delta^5$-androstene-3$\beta$,17$\beta$,19-triol.

PREPARATION IV

The compounds listed under I (described in U.S. Patent 3,065,228) were treated in accordance with Preparation II, thus giving the respective products set forth under II.

| I | II |
| --- | --- |
| 16$\alpha$-methyl-$\Delta^5$-pregnen-3$\beta$,19-diol-20-one. | 16$\alpha$-methyl-$\Delta^4$-pregnen-19-ol-3,20-dione. |
| 16$\beta$-methyl-$\Delta^5$-pregnen-3$\beta$,19-diol-20-one. | 16$\beta$-methyl-$\Delta^4$-pregnen-19-ol-3,20-dione. |
| 16$\alpha$,17$\alpha$-isopropylidenedioxy-$\Delta^5$-pregnene-3$\beta$,19-diol-20-one. | 16$\alpha$,17$\alpha$-isopropylidenedioxy-$\Delta^4$-pregnen-19-ol-3,20-dione. |
| 17-acetate of $\Delta^5$-pregnen-3$\beta$,17$\alpha$19-triol-20-one. | 17-acetate of $\Delta^4$-pregnen-17$\alpha$,19-diol-3,20-dione. |
| 17-acetate of 16$\alpha$-methyl-$\Delta^5$-pregnen-3$\beta$,17$\alpha$,19-triol-20-one. | 17-acetate of 16$\alpha$-methyl-$\Delta^4$-pregnene-17$\alpha$,19-diol-13-,20-dione. |
| 17-acetate of 17$\alpha$-ethinyl-$\Delta^5$-androstene-3$\beta$,17$\beta$,19-triol. | 17-acetate of 17$\alpha$-ethinyl-$\Delta^4$-androstene-17$\beta$,19-diol-3-one. |
| 17$\alpha$-ethinyl-$\Delta^5$-androstene-3$\beta$,17$\beta$,19-triol. | 17$\alpha$-ethinyl-$\Delta^4$-androstene-17$\beta$,19-diol-3-one. |
| 17$\alpha$-vinyl-$\Delta^5$-androstene-3$\beta$,17$\beta$,19-triol. | 17$\alpha$-vinyl-$\Delta^4$-androstene-17$\beta$,19-diol-3-one. |
| 17,20;20,21-bismethylenedioxy-$\Delta^5$-pregnene-3$\beta$,19-diol-11-one. | 17,20;20,21-bismethylenedioxy-$\Delta^4$-pregnen-19-ol-3,11-dione. |
| 17,20;20,21-bismethylenedioxy-$\Delta^5$-pregnene-3$\beta$,19-diol. | 17,20;20,21-bismethylenedioxy-$\Delta^4$-pregnen-19-ol-3-one. |

*Example 1*

To a solution of 20 g. of 19-hydroxy-$\Delta^4$-androstene-3,17-dione in 260 cc. of acetonitrile (distilled over phosphorous pentoxide) there was added 17.1 g. of 2-chloro-1,1,2-trifluorotriethylamine (N. N. Yarovenko et al., Journal of General Chemistory of the U.S.S.R., v. 29, 1959 (1959)) and the mixture was refluxed for 30 minutes; it was then evaporated to dryness under reduced pressure and the residue dissolved in hexane and chromatographed on 1 kg. of Florisil. The fractions eluted with hexane-ether 70/30 yielded 7.2 g. of 5,10-methylene-19-nor-$\Delta^1$-androstene-3,17-dione, M.P. 185–187° C.; [$\alpha$]$_D$ +253° (CHCl$_3$);

$\lambda^{EtOH}_{max.}$ 270–272 m$\mu$, log $\epsilon$ 3.80

Further elution with the same mixture of solvents gave 7.15 g. of 5,10-seco-5,19-cyclo-10β-fluoro-Δ⁴-androstene-3,17-dione; M.P. 179–180° C.; [α]_D −68° (CHCl₃);

$\lambda_{max.}^{EtOH}$ 240–242 mμ, log ε 4.09

*Example II*

To a solution of 7.5 g. of 19-hydroxy-Δ⁴-androstene-3,17-dione in 100 cc. of anhydrous tetrahydrofuran there was added 5.65 g. of 2-chloro-1,1,2-trifluorotriethylamine and the reaction mixture was kept at room temperature for 1 hour, it was then evaporated to dryness under reduced pressure and chromatographed over 300 g. of Florisil to produce 5,10-seco-5,19-cyclo-10β-fluoro-Δ⁴-androstene-3,17-dione, identical to that obtained in the previous example, and a small amount of 5,10-seco-5,19-cyclo-10α-fluoro-Δ⁴-androstene-3,17-dione.

*Example III*

In the method of Example 1, there was used anhydrous tetrahydrofuran instead of acetonitrile, to produce also 5,10-methylene-19-nor-Δ¹-androstene-3,17-dione and 5,10-seco, 5,19-cyclo-10β-fluoro-Δ⁴-androstene-3,17-dione in similar yields.

*Example IV*

Example I was repeated but using 1,1,2,2-tetrafluoroethyldimethylamine (1.5 molar equivalents) instead of 2-chloro-1,1,2-trifluorotriethylamine, thus producing the same products that in said example, in similar yields.

*Example V*

A solution of 5 g. of 17α-methyl-Δ⁴-androstene-17β,19-diol-3-one in 150 cc. of acetonitrile distilled over phosphorous pentoxide was treated with 4 g. of 2-chloro-1,1,2-trifluorotriethylamine and the reaction mixture let stand at 0° C. overnight. The solvent was then evaporated to dryness under vacuum and the oily residue purified by chromatography on 250 g. of Florisil, thus producing 5,10-methylene - 17α-methyl-19-nor-Δ¹-androsten-17β-ol-3-one and 5,10-seco-5,19-cyclo-10β-fluoro-17α-methyl-Δ⁴-androsten-17β-ol-3one.

By the same method, starting from 17α-vinyl-Δ⁴-androstene-17β,19-diol-3-one and 17α-ethinyl-Δ⁴-androstene-17β,19-diol-3-one there were obtained 5,10-methylene-17α-vinyl-19-nor-Δ¹-androsten-17β-ol-3-one, 5,10-seco-5,19-cyclo-10β-fluoro-17α-vinyl-Δ⁴-androsten - 17β - ol - 3-one; 5,10-methylene-17α-ethinyl-19-nor-Δ¹-androsten-17β-ol-3-one and 5,10-seco-5,19-cyclo-10β-fluoro-17α-ethinyl-Δ⁴-androsten-17β-ol-3-one, respectively.

*Example VI*

A solution of 3 g. of 5,10-methylene-19-nor-Δ¹-androstene-3,17-dione in 150 cc. of anhydrous tetrahydrofuran was added dropwise in a 15 minutes period to a stirred suspension of 3 g. of lithium aluminum hydride in 150 cc. of anhydrous tetrahydrofuran. The mixture was heated at reflux temperature for 2 hours, cooled and treated carefully with 10 cc. of ethyl acetate and 5 cc. of water. Solid sodium sulfate was then added, the inorganic material filtered off and washed several times with hot ethyl acetate; upon evaporation of the combined organic solutions there was obtained a crude product which was purified by crystallization from acetone-hexane, thus giving 5,10-methylene-19-nor-Δ¹-androstene-3β, 17β-diol.

A solution of 2 g. of the foregoing compound in 150 cc. of chloroform distilled over calcium chloride was oxidized by stirring for 18 hours at room temperature with 20 g. of freshly precipitated manganese dioxide. The inorganic material was filtered, washed with hot chloroform and the solution evaporated to dryness. Crystallization of the residue from acetone gave 5,10-methylene-19-nor-Δ¹-androsten-17β-ol-3-one; M.P. 155–157° C.; [α]_D −126° (CHCl₃), λ max. 242–244 mμ, log ε 4.12.

In a similar manner, 5,10-seco-5,19-cyclo-10β-fluoro-Δ⁴-androsten-3,17-dione was converted into 5,10-seco-5, 19-cyclo-10β-fluoro-Δ⁴-androsten-17β-ol-3-one.

*Example VII*

By following the method of Example I, the compounds listed below were converted into the corresponding 5,10-methylene-19-nor- and 5,10 - seco - 5,19-cyclo-10β-fluoro-derivatives, which were separated by chromatography on Florisil.

| Starting materials | Products | |
|---|---|---|
| 19-hydroxy progesterone | 5,10-methylene-19-nor-Δ¹-pregnene-3,20-dione. | 5,10-seco-5,19-cyclo-10β-fluoro-Δ⁴-pregnene-3,20-dione. |
| 16α-methyl-Δ⁴-pregnen-19-ol-3,20-dione. | 5,10-methylene-16α-methyl-19-nor-Δ¹-pregnene-3,20-dione. | 5,10-seco-5,19-cyclo-10β-fluoro-16α-methyl-Δ⁴-pregnene-3,20-dione. |
| 16β-methyl-Δ⁴-pregnen-19-ol-3,20-dione | 5,10-methylene-16β- methyl-19-nor-Δ¹-pregnene-3,20-dione. | 5,10-seco-5,19-cyclo-10β-fluoro-16β-methyl-Δ⁴-pregnene-3,20-dione. |
| 16α,17α-isopropylidenedioxy-Δ⁴-pregnen-19-ol-3,20-dione. | 5,10-methylene-16α,17α-isopropylidenedioxy-19-nor-Δ¹-pregnene-3,20-dione. | 5,10-seco-5,19-cyclo-10β-fluoro-16α,17α-isopropylidenedioxy-Δ⁴-pregnene-3,20-dione. |
| 17 acetate of Δ⁴-pregnene-17α,19-diol-3,20-dione. | 5,10-methylene-19-nor-Δ¹-pregnen-17α-ol-3,20-dione acetate. | 5,10-seco-5,19-cyclo-10β-fluoro-Δ⁴-pregnen-17α-ol-3,20-dione acetate. |
| 17 acetate of 16α-methyl-Δ⁴-pregnene-17α,19-diol-3,20-dione. | 5,10-methylene-16α-methyl-19-nor-Δ¹-pregnen-17α-ol-3,20-dione acetate. | 5,10-seco-5,19-cyclo-10β-fluoro-16α-methyl-Δ⁴-pregnen-17α-ol-3,20-dione acetate. |
| 17,20;20,21-bismethylenedioxy-Δ⁴-pregnen-19-ol-3,11-dione. | 17,20;20,21-bismethylenedioxy-5,10-methylene-19-nor-Δ¹-pregnene-3,11-dione. | 17,20;20,21-bismethylenedioxy-5,10-seco-5,19-cyclo-10β-fluoro-Δ⁴-pregnene-3,11-dione. |
| 17,20;20,21-bismethylenedioxy-Δ⁴-pregnen-19-ol-3-one. | 17,20;20,21-bismethylenedioxy-5,10-methylene-19-nor-Δ¹-pregnen-3-one. | 17,20;20,21-bismethylenedioxy-5,10-seco-5,19-cyclo-10β-fluoro-Δ⁴-pregnen-3-one. |

*Example VIII*

To a solution of 1 g. of 19-hydroxy progesterone in 200 cc. of anhydrous ether there was added 1.2 molar equivalents of 1,1,2,2-tetrafluoroethyldimethylamine, and the reaction mixture kept at room temperature for 45 minutes. It was then evaporated to dryness under vacuo and the residue chromatographed on 250 g. of Florisil, thus producing 5,10-seco-5,19-cyclo-10β-fluoro-Δ⁴-pregnene-3,20-dione (identical to the product obtained in the preceding example) and 5,10-seco-5,19-cyclo-10α-fluoro-Δ⁴-pregnene-3,20-dione.

*Example IX*

A mixture of 1 g. of 17,20;20,21-bismethylenedioxy-5, 10-seco-5,19-cyclo-10β-fluoro-Δ⁴-pregnene-3,11-dione and 20 cc. of 60% formic acid was heated on the steambath for 1 hour; it was cooled poured into water and the formed precipitate collected by filtration. Upon crystallization from acetone-ether there was obtained 5,10-seco- 5,19-cyclo-10β-fluoro-Δ4-pregnene-17α,21-diol-3,11,20-trione.

By the same method, the compounds listed below under I were hydrolyzed, thus producing the compounds under II.

| I | II |
|---|---|
| 17,20;20,21-bismethylenedioxy-5,10-methylene-19-nor-Δ¹-pregnene-3,11-dione. | 5,10-methylene-19-nor-Δ¹-pregnene-17α,21-diol-3,11,20-trione. |
| 17,20;20,21-bismethylenedioxy-5,10-methylene-19-nor-Δ¹-pregnen-3-one. | 5,10-methylene-19-nor-Δ¹-pregnene-17α,21-diol-3,20-dione. |
| 17,20;20,21-bismethylenedioxy-5,10-seco-5,19-cyclo-10β-fluoro-Δ⁴-pregnen-3-one. | 5,10-seco-5,19-cyclo-10β-fluoro-Δ⁴-pregnene-17α,21-diol-3,20-dione. | anhydride was kept at room temperature overnight; it was poured into ice-water and the formed precipitate collected by filtration, washed with water and dried. Upon crystallization from acetone-hexane there was obtained the acetate of 5,10-methylene-19-nor-Δ¹-androsten-17β-ol-3-one.

By the same method, 5,10-methylene-19-nor-Δ¹-pregnene-17α,21-diol-3,20-dione, 5,10-seco-5,19-cyclo-10β-fluoro-Δ⁴-pregnene-17α,21-diol-3,20-dione and 5,10-methylene-19-nor-Δ¹-pregnene-11β,17α,21-triol-3,20-dione were converted into the corresponding 21-monoacetates.

*Example XII*

By following the method described in the preceding example, the compounds listed below under I were treated with the indicated acid anhydrides, to produce the respective 17 or 21 esters (II).

| I | Acylating agent | II |
|---|---|---|
| 5,10-seco-5,19-cyclo-10β-fluoro-Δ⁴-pregnen-17α,21-diol-3,11,20-trione. | Propionic anhydride. | 21-propionate of 5,10-seco-5,19-cyclo-10β-fluoro-Δ⁴-pregnene-17α,21-diol-3,11,20-trione. |
| 5,10-seco-5,19-cyclo-10β-fluoro-Δ⁴-pregnene-11β,17α,21-triol-3,20-dione. | Acetic anhydride. | 21-acetate of 5,10-seco-5,19-cyclo-10β-fluoro-Δ⁴-pregnene-11β,17α,21-triol-3,20-dione. |
| 5,10-seco-5,19-cyclo-10β-fluoro-Δ⁴-androsten-17β-ol-3-one. | Cyclopentylpropionic anhydride. | Cyclopentylpropionate of 5,10-seco-5,19-cyclo-10β-fluoro-Δ⁴-androsten-17β-ol-3-one. |
| 5,10-methylene-19-nor-Δ¹-androsten-17β-ol-3-one. | Caproic anhydride. | Caproate of 5,10-methylene-19-nor-Δ¹-androsten-17β-ol-3-one. |
| 5-10-methylene-19-nor-Δ¹-pregnene-17α,21-diol-3,11,20-trione. | Acetic anhydride. | 21-acetate of 5,10-methylene-19-nor-Δ¹-pregnene-17α,21-diol-3,11,20-trione. |

*Example X*

By following the method described in Example VI, 2 g. of 17,20;20,21-bismethylenedioxy-5,10-seco-5,19-cyclo-10β-fluoro-Δ⁴-pregnene-3,11-dione were reduced with lithium aluminum hydride, thus producing 17,20;20,21-bismethylenedioxy-5,10-seco-5,19-cyclo-10β-fluoro-Δ⁴-pregnene-3β,11β-diol.

A mixture of 1 g. of the foregoing compound, 20 cc. of dioxane and 1.1 molar equivalents of 2,3-dichloro-5,6-dicyano-1,4-benzoquinone was stirred at room temperature for 3 hours. The hydroquinone formed was filtered off and the filtrate evaporated to dryness. The residue was dissolved in acetone and filtered through 20 g. of alumina, to produce 17,20;20,21-bismethylenedioxy-5,10-seco-5,19-cyclo-10β-fluoro-Δ⁴-pregnen-11β-ol-3-one. After hydrolysis of the bismethylenedioxy group with 60% formic acid, by following the method described in Example IX, there was obtained 5,10-seco-5,19-cyclo-10β-fluoro-Δ⁴-pregnene-11β,17α,21-triol-3,20-dione.

In a similar manner, starting from 17,20;20,21-bismethylenedioxy-5,10-methylene-19-nor-Δ¹-pregnene-3,11-dione there was produced as final product, 5,10-methylene-19-nor-Δ¹-pregnene-11β,17α,21-triol-3,20-dione.

*Example XI*

A mixture of 1 g. of 5,10-methylene-19-nor-Δ¹-androsten-17β-ol-3-one, 4 cc. of pyridine and 4 cc. of acetic

*Example XIII*

To a solution of 500 mg. of 5,10-methylene-17α-methyl-19-nor-Δ¹-androsten-17β-ol-3-one in 20 cc. of anhydrous benzene there were added 100 mg. of p-toluenesulfonic acid and 2 cc. of acetic anhydride and the mixture was allowed to stand for 24 hours at room temperature, poured into ice and water, and the resulting mixture stirred to effect hydrolysis of the excess anhydride. The benzene layer was separated and washed with 10% sodium carbonate solution and water. Drying, evaporation and crystallization of the residue from acetone-hexane produced the acetate of 5,10-methylene-17α-methyl-19-nor-Δ¹-androsten-17β-ol-3-one.

In a similar manner, the compounds below mentioned (I) were esterified with the indicated anhydrides, to produce the corresponding esters.

| I | Anhydride | II |
|---|---|---|
| 5,10-methylene-17α-vinyl-19-nor-Δ¹-androsten-17β-ol-3-one. | Propionic | Propionate of 5,10-methylene-17α-vinyl-19-nor-Δ¹-androsten-17β-ol-3-one. |
| 5,10-methylene-17α-ethinyl-19-nor-Δ¹-androsten-17β-ol-3-one. | Enanthic | Enanthate of 5,10-methylene-17α-ethinyl-19-nor-Δ¹-androsten-17β-ol-3-one. |
| 5,10-methylene-17α-methyl-19-nor-Δ¹-androsten-17β-ol-3-one. | Caproic | Caproate of 5,10-methylene-17α-methyl-19-nor-Δ¹-androsten-17β, ol-3-one. |
| 5,10-seco-5,19-cyclo-10β-fluoro-17α-methyl-Δ⁴-androsten-17β-ol-3-one. | Cyclopentylpropionic. | Cyclopentylpropionate of 5,10-seco-5,19-cyclo-10β-fluoro-17α-methyl-Δ⁴-androsten-17β-ol-3-one. |
| 5,10-seco-5,19-cyclo-10β-fluoro-17α-ethinyl-Δ⁴-androsten-17β-ol-3-one. | Undecenoic | Undecenoate of 5,10-seco-5,19-cyclo-10β-fluoro-17α-ethinyl-Δ⁴-androsten-17β-ol-3-one. |

*Example XIV*

To a solution of 5 g. of the acetate of 5,10-methylene-16α-methyl-19-nor-Δ¹-pregnen-17α-ol-3,20-dione acetate in 500 cc. of methanol there were added 500 mg. of potassium hydroxide dissolved in 1 cc. of water and the mixture was refluxed for 1 hour at room temperature, poured into water and the formed precipitate collected by filtration, thus producing 5,10-methylene-16α-methyl-19-nor-Δ¹-pregnen-17α-ol-3,20-dione.

A cooled solution of 4 g. of the preceding compound in 30 cc. of tetrahydrofuran and 18 cc. of methanol was treated under continuous stirring with 6 g. of pure calcium oxide, in small portions, and then with 6 g. of iodine. The stirring was continued at room temperature until the solution turned pale yellow. The mixture was poured into ice water containing 18 cc. of acetic acid and 2 g. of sodium thiosulfate. After stirring for 15 minutes the solution was decanted and the precipitate was collected by filtration, thus giving 21-iodo-5,10-methylene-16α-methyl-19-nor-$\Delta^1$-pregnen-17α-ol-3,20 - dione. This compound was mixed with 80 cc. of acetone and 12 g. of recently fused potassium acetate and the mixture was refluxed for 8 hours, concentrated to a small volume, diluted with water, and extracted with ethyl acetate; the extract was washed with water, dried over anhydrous sodium sulfate and concentrated until crystallization started. The precipitate was collected and crystallized from methanol-water, thus yielding the 21-acetate of 5,10-methylene-16α-methyl-19 - nor - $\Delta^1$-pregnene-17α,21-diol-3,20-dione.

A solution of 1 g. of the preceding compound in 50 cc. of methanol was treated with 3 cc. of a 5% potassium hydroxide solution, under nitrogen atmosphere, and the mixture was allowed to stand at 0° C. for 1 hour. It was then diluted with water and the formed precipitate collected by filtration, to produce 5,10-methylene-16α-methyl-19-nor-$\Delta^1$-pregnene-17α,21-diol-3,20-dione.

In a similar manner, starting from 5,10-methylene-16α,17α-isopropylidenedioxy-19 - nor - $\Delta^1$-pregnene-3,20-dione there were obtained 5,10-methylene-16α,17α-isopropylidenedioxy-19-nor-$\Delta^1$-pregnen - 21 - ol-3,20-dione acetate and the free compound.

*Example XV*

A strain of *Curvularia lunata* ATCC 13935 was grown in a Sabourini-glucose-agar medium (Difco). The growth obtained after incubating for a week at 25° C. was suspended in 5 cc. of sterile water. This suspension was divided in 5 portions of 1 cc. each which were employed for inoculating 5 Erlenmeyer flasks of 250 cc. capacity containing each 50 cc. of a culture medium of the following composition:

Glucose _____ 20 g.
$(NH_4)_2HPO_4$ _____ 5 g. or $NaNO_3$ . . . 3 g.
$K_2HPO_4$ _____ 1 g.
$MgSO_4.7H_2O$ _____ 0.2 g.
KCl _____ 0.5 g.
$ZnSO_4$ _____ Traces.
$FeSO_4.7H_2O$ _____ Traces.
Distilled water to complete 1 lt.

The cultures were incubated under rotatory stirring for 72 hours at 25° C. The growth was homogenized for 1 minute in a Waring Blendor; 2 cc. portions of the suspension thus obtained were employed for inoculating approximately 100 Erlenmeyer flasks containing the same medium described above. The mixtures were incubated for 24 hours under rotatory stirring at 25° C. and 280 r.p.m.; to each flask there was added 0.5 cc. of a solution of 0.5 g. of 5,10-methylene-16α-methyl-19-nor-$\Delta^1$-pregnene - 17α,21 - diol - 3,20 - dione, in 50 cc. of 95% ethanol and the incubation was continued under the same conditions for 48 hours. The contents of the flasks were combined and extracted with four portions of methylene chloride. The combined extract was dried over anhydrous sodium sulfate and concentrated at low temperature to a volume of 25 cc. This solution was absorbed on 4 g. of silica gel and eluted with methylene chloride (9:1) to produce 5,10-methylene-16α-methyl-19-nor-$\Delta^1$-pregnene-11β,17α,21-triol-3,20-dione.

By the same method 5,10-methylene-16α,17α-isopropylidenedioxy-19 - nor - $\Delta^1$-pregnen-21-ol-3,20-dione was converted into 5,10 - methylene - 16α,17α - isopropylidenedioxy-19-nor-$\Delta^1$-pregnene-11β,21-diol-3,20-dione.

*Example XVI*

In accordance with the method described in Example XI, the compounds obtained in the preceding example were converted into the corresponding acetates.

*Example XVII*

A solution of 1.1 equivalents of chromic acid in 5 cc. of 80% acetic acid was added dropwise to a stirred solution of 1 g. of the 21-acetate of 5,10-methylene-19-nor-$\Delta^1$- pregnene-11β,17α,21-triol-3,20-dione in 40 cc. of glacial acetic acid maintaining the temperature around 20° C. After 2 hours at room temperature the mixture was poured into ice water and the formed precipitate filtered, washed with water and recrystallized from methanol, thus giving the 21-acetate of 5,10-methylene-19-nor-$\Delta^1$-pregnene-17α,21-diol-3,11,20-trione.

In a similar manner, the 21-acetate of 5,10-methylene-16α,17α - isopropylidenedioxy-19-nor-$\Delta^1$-pregnene-11β,21-diol-3,20-dione, the 21-acetate of 5,10-methylene-16α-methyl-19-nor-$\Delta^1$-pregnene-11β,17α,21-triol - 3,20 - dione were converted respectively into the 21-acetate of 5,10-methylene - 16α,17α - isopropylidenedioxy - 19 - nor-$\Delta^1$-pregnen-21-ol-3,11,20-trione, the 21-acetate of 5,10-methylene-16α-methyl-19-nor-$\Delta^1$-pregnene - 17α,21 - diol-3,11,20-trione.

*Example XVIII*

A cold solution of 5 g. of the 21-acetate of 5,10-methylene-19-nor-$\Delta^1$-pregnene-11β,17α,21-triol-3,20-dione in 5 cc. of dimethylformamide was treated with 2.8 g. of mesyl chloride and 2.5 cc. of pyridine and the solution was kept at 80° C. for half an hour. The reaction mixture was cooled, water was added and the product was extracted with ethyl acetate. The extract was washed with water, dried over anhydrous sodium sulfate and the solvent was evaporated. Recrystallization of the residue from acetone-hexane furnished the 21-acetate of 5,10 - methylene-19-nor-$\Delta^{1,9(11)}$-pregnadiene-17α,21-diol-3,20-dione.

To a stirred solution of 2 g. of the latter compound in 20 cc. of pure dioxane there were added 0.4 cc. of 3 N-perchloric acid and 1 g. of N-bromoacetamide during 30 minutes.

The reaction mixture was stirred for 1 hour further, a solution of 10% sodium sulfite was then added until the potassium-starch indicator paper no longer turned blue, ice was added, the mixture was extracted with chloroform and the extract was washed consecutively with water, 5% aqueous sodium bicarbonate solution and water, and the solvent was removed by distillation under vacuo. By trituration of the residue with acetone there was obtained the corresponding bromohydrin.

A mixture of 2 g. of anhydrous potassium acetate and 20 cc. of acetone was heated almost to boiling and then a solution of 1.7 g. of the bromohydrin, in 20 cc. of acetone was added slowly while stirring; the mixture was then refluxed for 10 hours, cooled and almost all of the acetone was distilled off; iced-water was then added, the precipitate was filtered, washed with water and dried. Upon recrystallization from methylene chloride-benzene there was obtained the 21-acetate of 5,10-methylene-9β,11β-oxido-19-nor-$\Delta^1$-pregnene-17α,21-diol-3,20-dione.

In a polyethylene flask, adapted with a magnetic stirrer, there was dissolved 0.9 g. of the foregoing compound in 15 cc. of methylene chloride, the solution was cooled to 0° C. and a solution of 1.1 g. of anhydrous hydrogen fluoride in 3.7 cc. of tetrahydrofuran cooled in a Dry Ice acetone bath (−70° C.) was added over a period of 20 minutes with constant stirring. The mixture was stirred at a temperature lower than 10° C. for 6 additional hours, then neutralized by cautiously adding a 5% aqueous sodium bicarbonate solution and transferred to a separatory funnel. The organic layer was washed with water, dried over anhydrous sodium sulfate and concentrated until formation of an abundant precipitate. The mixture was cooled, the precipitate filtered and redissolved in hot ethyl acetate, the insoluble material was filtered off and the filtrate cooled whereby the 21-acetate of 5,10-methylene-9α-fluoro-19-nor-Δ¹-pregnene - 11β,17α,21 - triol-3,20-dione crystallized.

By the same method, the 21-acetate of 5,10-methylene-16α-methyl-19-nor-Δ¹-pregnene - 11β,17α,21 - triol-3,20-dione, the 21-acetate of 5,10-methylene-16α,17α-isopropylidenedioxy-19 - nor-Δ¹-pregnene - 11β,21 - diol-3,20-dione and the 21-acetate of 5,10-seco-5,19-cyclo-10β-fluoro-Δ⁴-pregnene-11β,17α,21-triol-3,20-dione were converted into the corresponding 9α-fluoro-derivatives.

To a solution of 1 g. of the 21-acetate of 5,10-methylene-16α-methyl - 9β,11β - oxido-19-nor-Δ¹-pregnene-17α,21-diol-3,20-dione, obtained in accordance with the preceding example, in 10 cc. of anhydrous chloroform, was added, over a period of 15 minutes, 8 cc. of 0.45 N solution of dry hydrogen chloride in chloroform, under continuous stirring and maintaining the temperature around 0° C. The mixture was then stirred at 0° C. for 1 hour further, diluted with water and the chloroform layer was separated, washed with aqueous sodium bicarbonate solution and then with water, dried over anhydrous sodium sulfate and evaporated under reduced pressure. Crystallization of the residue from acetone-hexane gave the 21-acetate of 5,10 - methylene-16α-methyl-9α-chloro - 19 - nor-Δ¹-pregnene-11β,17α,21-triol-3,20-dione.

The latter compound was oxidized with 8 N chromic acid in acetone, in accordance with the method described in Example III, to give the 21-acetate of 5,10-methylene-16α-methyl - 9α - chloro-19-nor-Δ¹-pregnene-17α,21-diol-3,11,20-trione.

I claim:
1. A compound represented by the formula:

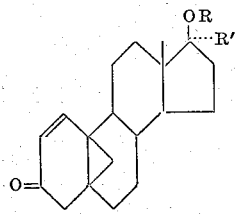

wherein R is selected from the group consisting of hydrogen and an acyl group containing less than 12 carbon atoms and $R^1$ is selected from the group consisting of hydrogen, lower alkyl, lower alkenyl and lower alkinyl.

2. 5,10-methylene-19-nor-Δ¹-androsten-17β-ol-3-one.

3. 5,10-methylene - 17α - methyl-19-nor-Δ¹-androsten-17β-ol-3-one.

4. A compound representing by the formula:

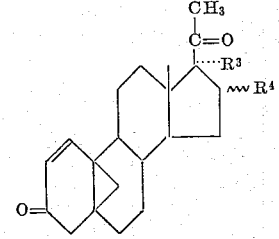

wherein $R^3$ is selected from the group consisting of hydrogen, hydroxyl and an acyloxy group containing less than 12 carbon atoms; $R^4$ is selected from the group consisting of hydrogen, α-methyl, β-methyl and α-hydroxy, and $R^3$ and $R^4$ taken together represent the grouping

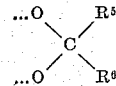

wherein $R^5$ is selected from the group consisting of hydrogen and lower alkyl and $R^6$ is selected from the group consisting of hydrogen, lower alkyl, monocyclic aryl, monocyclic aralkyl and monocyclic alkaryl.

5. 5,10-methylene-19-nor-Δ¹-pregnene-3,20-dione.

6. The acetate of 5,10-methylene-19-nor-Δ¹-pregnen-17α-ol-3,20-dione.

7. A compound represented by the formula:

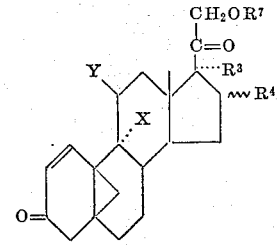

wherein $R^3$ is hydroxyl; $R^4$ is selected from the group consisting of hydrogen, α-methyl, β-methyl and α-hydroxyl; $R^3$ and $R^4$ taken together represent the grouping

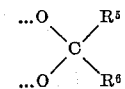

wherein $R^5$ is selected from the group consisting of hydrogen and lower alkyl and $R^6$ is selected from the group consisting of hydrogen, lower alkyl, monocyclic aryl, monocyclic aralkyl and monocyclic alkaryl; $R^7$ is selected from the group consisting of hydrogen and an acyl group containing less than 12 carbon atoms; X is selected from the group consisting of hydrogen, fluorine and chlorine and Y is selected from the group consisting of hydrogen, β-hydroxyl and keto, with X being hydrogen when Y is hydrogen.

8. 5,10-methylene-19-nor-Δ¹-pregnene-17α,21-diol-3,20-dione.

9. 5,10-methylene-19-nor-Δ¹-pregnene-11β,17α,21-triol-3,20-dione.

10. 5,10-methylene - 19 - nor-Δ¹-pregnene-17α,21-diol-3,11,20-trione.

11. A compound represented by the formula:

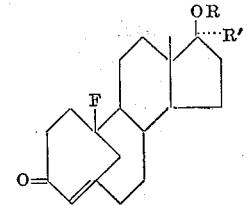

wherein R is selected from the group consisting of hydrogen and an acyl group containing less than 12 carbon atoms and $R^1$ is selected from the group consisting of hydrogen, lower alkyl, lower alkenyl and lower alkinyl.

12. 5,10 - seco-5,19-cyclo-10β-fluoro-Δ⁴-androsten-17β-ol-3-one.

13. A compound represented by the formula:

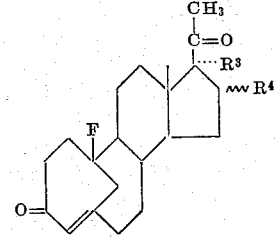

wherein $R^3$ is selected from the group consisting of hydrogen, hydroxyl and an acyloxy group containing less than 12 carbon atoms; $R^4$ is selected from the group consisting of hydrogen, α-methyl, β-methyl and α-hydroxy, and R³ and R⁴ taken together represent the grouping

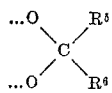

wherein R⁵ is selected from the group consisting of hydrogen and lower alkyl and R⁶ is selected from the group consisting of hydrogen, lower alkyl, monocyclic aryl, monocyclic aralkyl and monocyclic alkaryl.

14. 5,10 - seco-5,19-cyclo-10β-fluoro-Δ⁴-pregnene-3,20-dione.

15. A compound represented by the formula:

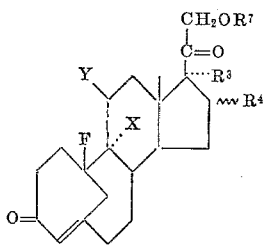

wherein R³ is hydroxyl; R⁴ is selected from the group consisting of hydrogen, α-methyl, β-methyl and α-hydroxyl; R³ and R⁴ taken together represent the grouping

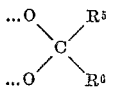

wherein R⁵ is selected from the group consisting of hydrogen and lower alkyl and R⁶ is selected from the group consisting of hydrogen, lower alkyl, monocyclic aryl, monocyclic aralkyl and monocyclic alkaryl; R⁷ is selected from the group consisting of hydrogen and an acyl group containing less than 12 carbon atoms; X is selected from the group consisting of hydrogen, fluorine and chlorine and Y is selected from the group consisting of hydrogen, β-hydroxyl and keto, with X being hydrogen when Y is hydrogen.

16. 5,10-seco-5,19-cyclo-10β-fluoro-Δ⁴-pregnene-17α,21-diol-3,20-dione.

17. 5,10 - seco-5,19-cyclo-10β-fluoro-Δ⁴-pregnene-11β,17α,21-triol-3,20-dione.

18. 5,10-seco-5,19-cyclo-10β-fluoro-Δ⁴-pregnene-17α,21-diol-3,11,20-trione.

19. A process for the preparation of 5,10-methylene-19-nor-Δ¹-3-keto- and 5,10-seco-5,19-cyclo-10-fluoro-Δ⁴-3-keto-steroids of the androstane and pregnane series from the corresponding 19-hydroxy-Δ⁴-3-keto - steroid which comprises treating said 19-hydroxy steroid, in an inert organic solvent containing no acidic hydrogen, with a fluorinated amine represented by the general formula:

$$ACF_2N(A^1)_2$$

wherein A represents a fluorinated lower alkyl group and A¹ represents a lower alkyl group.

20. A process as described in claim 19 wherein the fluorinated amine is 2-chloro-1,1,2-trifluorotriethylamine.

21. A process as described in claim 19 wherein the fluorinated amine is 1,1,2,2-tetrafluoroethyldimethylamine.

22. A process as described in claim 19 wherein the inert organo solvent is acetonitrile.

23. A process as described in claim 19 wherein the inert organic solvent is tetrahydrofuran.

24. A process as described in claim 19 wherein the reaction is conducted at reflux temperature for about 30 to about 60 minutes.

No references cited.

LEWIS GOTTS, *Primary Examiner*.